(12) United States Patent
Oh et al.

(10) Patent No.: US 10,387,935 B2
(45) Date of Patent: Aug. 20, 2019

(54) SYSTEM AND METHOD FOR PROVIDING SHOPPING INFORMATION

(71) Applicant: NAVER CORPORATION, Seongnam-si (KR)

(72) Inventors: Eun Ji Oh, Seongnam-si (KR); Hee Jeong Son, Seongnam-si (KR)

(73) Assignee: NAVER Corporation, Seongnam-si (KR)

( * ) Notice: Subject to any disclaimer, the term of this patent is extended or adjusted under 35 U.S.C. 154(b) by 721 days.

(21) Appl. No.: 15/001,123

(22) Filed: Jan. 19, 2016

(65) Prior Publication Data

US 2016/0210677 A1 Jul. 21, 2016

(30) Foreign Application Priority Data

Jan. 20, 2015 (KR) .................. 10-2015-0009469

(51) Int. Cl.
*G06Q 30/00* (2012.01)
*G06Q 30/06* (2012.01)

(52) U.S. Cl.
CPC ..... *G06Q 30/0625* (2013.01); *G06Q 30/0631* (2013.01); *G06Q 30/0641* (2013.01)

(58) Field of Classification Search
CPC .......... G06Q 30/0625; G06Q 30/0631; G06Q 30/0641

(Continued)

(56) References Cited

U.S. PATENT DOCUMENTS 8,275,384 B2 * 9/2012 Das ................ G06Q 30/02
455/450

9,160,808 B2 * 10/2015 Zhang .................... G06Q 30/06
(Continued)

FOREIGN PATENT DOCUMENTS

CN 103729775 A 4/2014
JP 2012-173818 9/2012
(Continued)

OTHER PUBLICATIONS

"Time weight update model based on the memory principle in collaborative filtering," Li, Dan; Cao, Peng; Guo, Yucui; Lei, Min. Journal of Computers 8.11: 2763(5). Academy Publisher. (Nov. 2013); 11pgs. (Year: 2013).*

(Continued)

*Primary Examiner* — Robert M Pond
(74) *Attorney, Agent, or Firm* — Greer Burns & Crain, Ltd.

(57) ABSTRACT

A shopping information providing system that receives first product information selected by a first user from among a plurality of pieces of product information included in at least one piece of category information selected by the first user; searches for second users who selected at least one piece of information from the first product information and searches for second product information as one or more pieces of product information selected by the second user from among a plurality of pieces of product information included in at least one piece of category information selected by the second user; sets second users who selected more than a predetermined number of third product information commonly selected by the first and second users as interest friends of the first user; and provides information from among the one or more pieces of the third product information, fourth product information, and fifth product information.

17 Claims, 15 Drawing Sheets

(58) Field of Classification Search
USPC .......................................... 705/26, 27; 1/1
See application file for complete search history.

(56) References Cited

U.S. PATENT DOCUMENTS

| | | | |
|---|---|---|---|
| 2011/0230229 A1* | 9/2011 | Das ..................... | G06Q 30/02 |
| | | | 455/550.1 |
| 2014/0129292 A1* | 5/2014 | Ruvini ............... | G06Q 30/0241 |
| | | | 705/7.34 |
| 2019/0012719 A1* | 1/2019 | Anderson ............. | G06Q 30/02 |

FOREIGN PATENT DOCUMENTS

| | | |
|---|---|---|
| KR | 10-2001-0092819 | 10/2001 |
| KR | 10-2012-0139167 | 12/2012 |
| KR | 10-2014-0091143 | 7/2014 |

OTHER PUBLICATIONS

Office Action dated Nov. 1, 201G issued in corresponding Japanese Patent Application No. 2015 253326.
Liu, Yuru, Office Action issued by the State Intellectual Property Office of China for corresponding Chinese Patent Application No. 201610034238.5, dated Feb. 22, 2019.

* cited by examiner

SYSTEM AND METHOD FOR PROVIDING SHOPPING INFORMATION

CROSS-REFERENCE TO RELATED APPLICATIONS

This application claims the benefit of Korean Patent Application No. 10-2015-0009469, filed on Jan. 20, 2015, in the Korean Intellectual Property Office, the disclosure of which is incorporated herein in its entirety by reference.

BACKGROUND

1. Field

One or more exemplary embodiments relate to a system and method for providing shopping information.

2. Description of the Related Art

These days, a rapidly increasing number of users purchase products in online shopping malls. As the online shopping mall business market expands at a very fast rate, competition for attracting more users is growing between numerous online shopping malls.

Therefore, in order for more users to access an online shopping mall website and purchase products, online shopping mall managers exert a great amount of effort to make users who access their online shopping mall websites become more interested in their online shopping mall websites than in other online shopping mall websites.

SUMMARY

One or more exemplary embodiments provide a shopping information providing system that displays product information in accordance with interests and tastes of a user and product information of other users who have similar interests and tastes to those of the user on a user terminal, and thus the user may search for more products relating to the user's interests and tastes, thereby increasing shopping satisfaction.

One or more exemplary embodiments provide a shopping information providing system that recommends product information in accordance with interests and tastes of a user and other users who have similar interests and tastes to those of the user as 'interest friends' on a user terminal to allow the user to search for product information of the interest friends, and thus the user may add categories and product information previously not of interest as new categories and product information of interest to search for more various products, thereby increasing shopping satisfaction.

Additional aspects will be set forth in part in the description which follows and, in part, will be apparent from the description, or may be learned by practice of the presented embodiments.

According to one or more exemplary embodiments, a shopping information providing system includes a receiving unit configured to receive first product information as one or more pieces of product information selected by a first user from among a plurality of pieces of product information included in one or more pieces of category information selected by the first user in connection with shopping; a search unit configured to search for one or more second users who select one or more pieces of information from the first product information and search for second product information as one or more pieces of product information selected by the second user from among a plurality of pieces of product information included in one or more pieces of category information selected by the second user; a setting unit configured to set one or more second users who selected more than a predetermined number of third product information that is commonly selected by the first user and the second user as an interest friend of the first user; and a control unit configured to provide one or more pieces of information from among the one or more pieces of the third product information, fourth product information as one or more pieces of product information excluding the third product information from the first product information, and fifth product information as one or more pieces of product information excluding the third product information from the second product information to the first user.

The shopping information providing system may further include: a recommendation unit configured to generate interest friend recommendation information including identification information of the interest friend and one or more pieces of product information relating to the interest friend and providing the interest friend recommendation information to the first user such that the first user selects the interest friend set by the setting unit as a preference friend.

The control unit may output first interest information including a first indicator indicating that the first user and one or more interest friends commonly selected the third product information and collected count information with respect to the one or more interest friends who commonly selected the third product information on a part of a region displaying the third product information, the control unit outputs second interest information including a second indicator indicating that the first user selects the fourth product information and collected count information with respect to other users who selected the fourth product information on a part of a region displaying the fourth product information, or the control unit outputs third interest information including a third indicator indicating that the second user selected the fifth product information and collected count information with respect to other users who selected the fifth product information on a part of a region displaying the fifth product information.

The control unit may output one or more pieces of first identification information indicating the interest friend who commonly selected the third product information on another part of a region displaying the third product information, the control unit outputs one or more pieces of second identification information indicating one or more users who selected the fourth product information on another part of a region displaying the fourth product information, or the control unit outputs one or more pieces of third identification information indicating one or more users who selected the fifth product information on another part of a region displaying the fifth product information.

In response to receiving a signal of selecting one piece of identification information from among the one or more pieces of first through third identification information, the control unit may output the third through the fifth product information relating to a user or an interest friend included in the selected identification information.

In response to receiving a signal of selecting one piece of product information from among the third through fifth product information for purchase, the control unit may output one or more pieces of the fourth identification information indicating sale information relating to the selected identification information or one or more users or interest friends who selected the selected product information or commonly selected the selected identification information.

In response to receiving a signal of selecting one piece of fourth identification information from among the one or more pieces of fourth identification information, the control unit may output the third through fifth product information relating to the one or more users or interest friends included in the selected identification information.

The shopping information providing system may further include: a generating unit configured to generate a preference friend list as information relating to one or more preference friends who are selected and added by the first user from the interest friend recommendation information according to a request of the first user and providing the preference friend list to the first user.

The generating unit may generate, for each of the one or more preference friends, the preference friend list including one or more pieces of information from among identification information of the one or more preference friends, one or more pieces of representative category information selected by the one or more preference friends, collected count information of the third product information that is commonly selected by the first user and the one or more preference friends, and collected count information regarding other users who store the one or more preference friends as one or more preference friends, and provides the preference friend list to the first user.

In response to receiving a signal of selecting information of one preference friend included the preference friend list, the generating unit may generate and output one or more pieces of information from among identification information of the preference friend whose information is selected, collected count information of the third product information that is commonly selected by the first user and the preference friend, collected count information regarding other users who selected the fourth product information of the preference friend, collected count information regarding other users who stored the preference friend as a preference friend, one or more pieces of category information selected by other users from among one or more categories selected by the preference friend, identification information of the other users who stored the preference friend as the preference friend, identification information of other users who are stored by the preference friend as preference friends, and the third through fifth product information relating to the preference friend.

According to one or more exemplary embodiments, a shopping information providing method includes receiving first product information as one or more pieces of product information selected by a first user from among a plurality of pieces of product information included in one or more pieces of category information selected by the first user in connection with shopping; searching for one or more second users who selected one or more pieces of information from the first product information and searching for a second product information as one or more pieces of product information selected by the second user from among a plurality of pieces of product information included in one or more pieces of category information selected by the second user; setting one or more second users who selected more than a predetermined number of third product information that is commonly selected by the first user and the second user as an interest friend of the first user; and providing one or more pieces of information from among the one or more pieces of the second product information, fourth product information as one or more pieces of product information excluding the third product information from the first product information, and fifth product information as one or more pieces of product information excluding the third product information from the second product information to the first user.

The shopping information providing method may further include: generating interest friend recommendation information including identification information of the interest friend and one or more pieces of product information relating to the interest friend and providing the interest friend recommendation information to the first user such that the first user selects the interest friend set as a preference friend.

The shopping information providing method may further include: outputting first interest information including a first indicator indicating that the first user and one or more interest friends commonly selected the third product information and collected count information with respect to the one or more interest friends who commonly selected the third product information on a part of a region displaying the third product information; outputting second interest information including a second indicator indicating that the first user selected the fourth product information and collected count information with respect to other users who selected the fourth product information on a part of a region displaying the fourth product information; and outputting third interest information including a third indicator indicating that the second user selected the fifth product information and collected count information with respect to other users who selected the fifth product information on a part of a region displaying the fifth product information.

The shopping information providing method may further include: outputting one or more pieces of first identification information indicating the interest friend who commonly selected the third product information on another part of a region displaying the third product information; outputting one or more pieces of second identification information indicating one or more users who selected the fourth product information on another part of a region displaying the fourth product information; and outputting one or more pieces of third identification information indicating one or more users who selected the fifth product information on another part of a region displaying the fifth product information.

The shopping information providing method may further include: in response to receiving a signal of selecting one piece of identification information from among the one or more pieces of first through third identification information, outputting the third through fifth product information relating to a user or an interest friend included in the selected identification information.

The shopping information providing method may further include: in response to receiving a signal of selecting one piece of product information from among the third through fifth product information for purchase, outputting one or more pieces of fourth identification information indicating sale information relating to the selected product information or one or more users or interest friends who selected the selected product information or commonly selected the selected product information; and in response to receiving a signal of selecting one piece of fourth identification information from among the one or more pieces of the fourth identification information, outputting the third through fifth product information relating to the one or more users or interest friends included in the selected fourth identification information.

The shopping information providing method may further include: generating a preference friend list as information relating to one or more preference friends who are selected and added by the first user from the interest friend recommendation information according to a request of the first user and providing the preference friend list to the first user.

The shopping information providing method may further include, for each of the one or more preference friends, generating the preference friend list including one or more pieces of information from among identification information of the one or more preference friends, one or more pieces of representative category information selected by the one or more preference friends, collected count information of the third product information that is commonly selected by the first user and the one or more preference friends, and collected count information regarding other users who stored the one or more preference friends as one or more preference friends, and providing the preference friend list to the first user.

The shopping information providing method may further include, in response to receiving a signal of selecting information of one preference friend included the preference friend list, generating and outputting one or more pieces of information from among identification information of the preference friend whose information is selected, collected count information of the third product information that is commonly selected by the first user and the preference friend, collected count information regarding other users who selected the fourth product information of the preference friend, collected count information regarding other users who stored the preference friend as a preference friend, one or more pieces of category information selected by other users from among one or more categories selected by the preference friend, identification information of the other users who stored the preference friend as the preference friend, identification information of other users who are stored by the preference friend as preference friends, and the third through fifth product information relating to the preference friend.

According to one or more exemplary embodiments, there are provided other methods and systems for accomplishing the inventive concept, and a non-transitory computer-readable recording medium having recorded thereon a computer program for performing the other methods.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
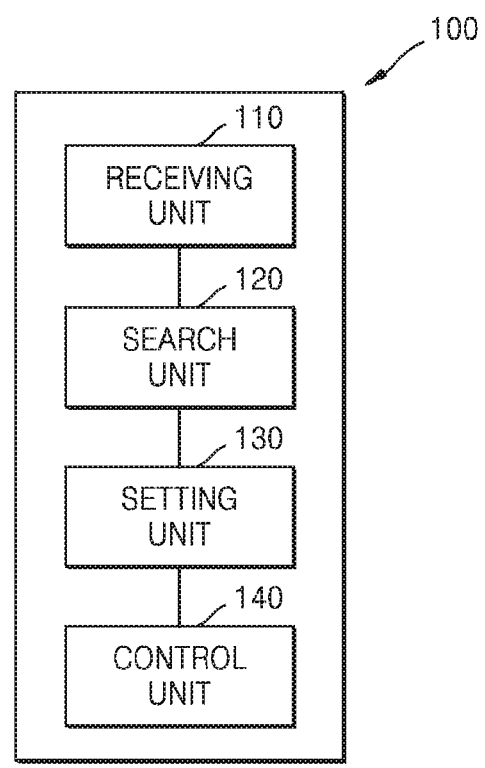
FIG. 1 is a schematic block diagram of a shopping information providing system according to an exemplary embodiment.

Reference will now be made in detail to the embodiments, examples of which are illustrated in the accompanying drawings. In this regard, the present embodiments may have different forms and should not be construed as being limited to the descriptions set forth herein. It should be obvious to those of ordinary skill in the art that the above exemplary embodiments are intended to cover all modifications, equivalents, and alternatives falling within the scope of the inventive concept. The exemplary embodiments set forth herein are provided so that this disclosure will be thorough and complete and will fully convey the inventive concept to those of ordinary skill in the art.

In the following description, well-known functions or constructions are not described in detail if it is determined that they would obscure the inventive concept due to unnecessary detail.

The specific terms used in the present disclosure are not intended to restrict the scope of the inventive concept and are only used for a better understanding of exemplary embodiments of the inventive concept. As used herein, the singular forms "a," "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. In the following exemplary embodiments, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

As used herein, the term "and/or" includes any and all combinations of one or more of the associated listed items. Expressions such as "at least one of," when preceding a list of elements, modify the entire list of elements and do not modify the individual elements of the list.

The term "category" used in shopping information may generally indicate a hierarchical classification of common features of products in an order from higher features to lower features and may be expressed as a high class category, a middle class category, and a low class category.

In the present specification, the term "high class category" may refer to common features of products that are provided by a shopping information providing system and are displayed on a home screen of a user terminal, and may include, for example, a category of tangible products such as a list of women's clothes, a list of men's clothes, a list of fashion accessories, a list of layette baby/child products, etc. and a category of intangible products such as a list of travel destinations, a list of cultural events, etc. The shopping information providing system may display, on the user terminal, one or more pieces of product information included in the high class category according to a selection of the high class category displayed on the home screen of the user terminal.

The term "middle class category" may refer to common features of products that are provided by the shopping information providing system and are displayed on the user terminal in response to receiving a signal of selecting a list from the high class category, and may include, for example, an entire list of women's clothes, a list of tops, a list of bottoms, a list of dress/suit, a list of outerwear, a list of underwear, etc. that are provided by the shopping information providing system and are displayed on the user terminal in response to receiving a signal of selecting the women clothes list from the high class category. The shopping information providing system may display one or more pieces of product information included in the middle class category according to a selection of the middle class category displayed on the user terminal.

The term "low class category" may refer to common features of products that are provided by the shopping information providing system and are displayed on the user terminal in response to receiving a signal of selecting a list from the middle class category, and may include, for example, baggy pants, patterned pants, shorts, cotton pants, etc. of bottoms of women clothes that are provided by the shopping information providing system and are displayed on the user terminal in response to receiving a signal of selecting the bottoms list from the middle class category. The shopping information providing system may display one or more pieces of product information included in the low class category according to a selection of the low class category displayed on the user terminal. In this regard, although examples of the low category list are limited to the selection of the bottoms list from the middle class category, product purchase information included in the low class category may depend on other lists selected from the middle class category.

Hereinafter, throughout the specification, the term "category" need not indicate the hierarchical classification of common features of products in the order from higher features to lower features as described above but may instead subdivide entire categories including the high class category, the middle class category, and the low class category and provide the subdivided categories on one screen horizontally. For example, in the present embodiment, the shopping information providing system may display the women clothes list of the high class category, the bottoms list of the middle class category, and baggy pants, pattern pants, shorts, cotton pants, etc. of the low class category on one screen of the user terminal horizontally. As described above, since the high class category, the middle class category, and the low class category are displayed on one screen of the user terminal horizontally, users may directly select a desired low class category on one screen and search for product information without having to proceed in the order of the high class category, the middle class category, and the low class category during a product information search, thereby providing user convenience.

Hereinafter, exemplary embodiments will be described in detail with reference to the accompanying drawings, in which like reference numerals refer to like elements throughout and are not redundantly described here.

FIG. 1 is a schematic block diagram of a shopping information providing system 100 according to an exemplary embodiment. Referring to FIG. 1, the shopping information providing system 100 may include a receiving unit 110, a search unit 120, a setting unit 130, and a control unit 140. As used herein throughout this Specification, the terms "unit" may refer to functions performed by any type of computer processor capable of being programmed, and it should be noted the functions of multiple "units" can be performed in separate processors or a single processor and/or that the functions of a single "unit" can be performed by a single processor or by multiple processors.

The shopping information providing system 100 may display category information described above on a terminal of an accessed first user. The receiving unit 110 may receive one or more pieces of low class category information selected by the first user in connection with shopping and first product information. In this regard, the first product information may include one or more pieces of product information selected by the first user from among a plurality of pieces of product information included in the low class category selected by the first user. The product information may be provided with one of, for example, an interest button, a sympathy button, and a like button that may express an interest in the product information or sympathy with the product information. The one or more pieces of product information selected by the first user may include one or more pieces of product information that the first user selects one of the interest button, the sympathy button, and the like button that are included in the product information. For example, if the first user selects jumpers, blue jeans, and backpacks as a low class category from category information displayed on a screen of the terminal of the first user, the receiving unit 110 may receive and store low class category information of the selected jumpers, blue jeans, and backpacks. If the first user searches for a plurality of pieces of product information included in the same low class category as the selected jumpers, blue jeans, and backpacks and selects jumpers A and B, blue jeans A and B, and backpacks A and B from among the plurality of pieces of product information, the receiving unit 110 receives and stores the jumpers A and B, the blue jeans A and B, and the backpacks A and B that are selected by the first user as first product information.

In the present embodiment, although the receiving unit 110 receives and stores the low class category information and the first product information that are selected by the first user, this is for convenience of description, and the receiving unit 110 may display the category information described above on all user terminals that access the shopping information providing system 100 and receive and store category information selected by all accessed users and one or more pieces of product information selected from among a plurality of pieces of product information included in the selected category information.

The search unit 120 may search for one or more second user(s) who selected one or more pieces of information from the first product information selected by the first user from selection category information and selection product information of users received by the receiving unit 110. When the second users have been completely searched, the search unit 120 may search for one or more pieces of low class category information selected by the second user and second product information. In this regard, the second product information may include one or more pieces of product information selected by the second user from a plurality of pieces of product information included in a low class category selected by the second user who has selected the selected one or more pieces of product information.

For example, the search unit 120 may search for jumpers, blue jeans, backpacks, baseball caps, and watches as the low class category information selected by the second user and may search for the jumper A, a jumper C, the blue jeans A, blue jeans C, the backpack A, a backpack C, a baseball cap A, and a watch A as the found low class category information and the second product information selected by the second user.

The setting unit 130 may set one or more second users who selected more than a predetermined number of pieces of third product information that are commonly selected by the first user and the second user as an interest friend of the first user. In this regard, the third product information may include one or more pieces of first product information commonly selected by the first user and the second user.

For example, the setting unit 130 may compare the first product information including the jumpers A and B, the blue jeans A and B, and the backpacks A and B that are selected by the first user and the second product information including the jumper A, a jumper C, the blue jeans A, blue jeans C, the backpack A, the backpack C, the baseball cap A, and the watch A that are selected by the second user and may set the jumper A, the blue jeans A, and the backpack A as the third product information.

The setting unit 130 may include a selection number of the third product information as an interest friend setting condition of the first user. The setting unit 130 may set one or more second users that have the selection number of pieces of the third product information that are more than a predetermined number (e.g., 3) as the interest friend of the first user, and may set a second user whose selection number of pieces of the third product information is less than the predetermined number as being excluded from the interest friend of the first user.

Once the setting unit 130 completely sets the interest friend of the first user, the control unit 140 outputs one or more pieces of third product information through fifth product information on a shopping home screen of the terminal of the first user whenever the first user accesses the shopping information providing system 100.

In this regard, the third product information may be one or more pieces of first product information commonly selected by the first user and the second user from among the first and second product information selected by the first user and the second user described above, and may include, for example, the jumper A, the blue jeans A, and the backpack A. The fourth product information may be the first product information selected by the first user from among the first and second product information selected by the first user and the second user, i.e., one or more pieces of product information of the first product information excluding the third product information, and may include, for example, the jumper B, the blue jeans B, and the backpack B. The fifth product information may be the second product information selected by the second user from among the first and second product information selected by the first user and the second user, i.e., one or more pieces of product information of the second product information excluding the third product information, and may include, for example, the jumper C, the blue jeans C, and the backpack C.

As a selective embodiment, the control unit 140 may output first interest information including a first indicator indicating that the first user and one or more interest friends have commonly selected the third product information and collected count information regarding the interest friends who have commonly selected the third product information in a part of a region displaying the third product information.

In this regard, the collected count information regarding the interest friends may be the total sum of the interest friends who have commonly selected the third product information. The first user may be excluded from the collected count information regarding the interest friends. The control unit 140 may output one or more pieces of first identification information indicating that the interest friends who have commonly selected the third product information are present in another part of the region displaying the third product information. In this regard, the first identification information may include a representative image indicating the interest friends. The control unit 140 may output the first identification information of an interest friend who has many collected count numbers of the third product information commonly selected with the first user as priority when outputting the first identification information. In response to receiving a signal of selecting one piece of first identification information from the one or more pieces of first identification information, the control unit 140 may output the third through fifth product information relating to the interest friend included in the selected first identification information.

As a selective embodiment, in response to receiving a signal of selecting one piece of third product information for purchase from the one or more pieces of third product information, the control unit 140 may output sale information regarding the selected third product information and one or more pieces of fourth identification information indicating that the interest friends who have commonly selected the third product information are present. In this regard, the fourth identification information may be the same as the first identification information. In response to receiving a signal of selecting one piece of fourth identification information from the one or more pieces of fourth identification information, the control unit 140 may output the third through fifth product information relating to the interest friends included in the selected fourth identification information.

As a selective embodiment, the control unit 140 may output second interest information including a second indicator indicating that only the first user has selected the fourth product information and then the control unit will collect count information regarding other users who later select the fourth product information in a part of a region displaying the fourth identification information. In this regard, the collected count information regarding the other users may be the total sum of the other users who select the fourth product information. The second user may be excluded from the collected count information regarding the other users. The control unit 140 may output one or more pieces of second identification information indicating that the other users who have selected the fourth product information are present in another part of the region displaying the fourth product information. In this regard, the second identification information may include representative image(s) indicating the other users. The control unit 140 may output the second identification information of a user who has many collected count numbers of the selected fourth product information as priority information. In response to receiving a signal of selecting one piece of second identification information from the one or more pieces of second identification information, the control unit 140 may output the third through fifth product information relating to the user included in the selected second identification information.

As a selective embodiment, in response to receiving a signal of selecting one piece of fourth product information for purchase from the one or more pieces of fourth product information, the control unit 140 may output sale information regarding the selected fourth product information and one or more pieces of fourth identification information indicating that the other users who have selected the fourth product information are present. In this regard, the fourth identification information may be the same as the second identification information. In response to receiving a signal of selecting one piece of fourth identification information from the one or more pieces of fourth identification information, the control unit 140 may output the third through fifth product information relating to the user included in the selected fourth identification information.

As a selective embodiment, the control unit 140 may output third interest information including a third indicator indicating that only the second user has selected the fifth product information and then the control unit will collect count information regarding other users who have later select the fifth product information in a part of a region displaying the fifth identification information. In this regard, the collected count information regarding the other users may be the total sum of the other users who select the fifth product information. The first user may be excluded from the collected count information regarding the other users. The control unit 140 may output one or more pieces of third identification information indicating that the other users who selected the fifth product information are present in another part of the region displaying the fifth product information. In this regard, the third identification information may include representative image(s) indicating the other users. The control unit 140 may output the third identification information of a user who has many collected count numbers of the selected fifth product information as priority information. In response to receiving a signal of selecting one piece of third identification information from the one or more pieces of third identification information, the control unit 140 may output the third through fifth product information relating to the user included in the selected third identification information.

As a selective embodiment, in response to receiving a signal of selecting one piece of fifth product information for purchase from the one or more pieces of fifth product information, the control unit 140 may output sale information regarding the selected fifth product information and one or more pieces of fourth identification information indicating that the other users who selected the fourth product information are present. In this regard, the fourth identification information may be the same as the third identification information. In response to receiving a signal of selecting one piece of fourth identification information from the one or more pieces of fourth identification information, the control unit 140 may output the third through fifth product information relating to the user included in the selected fourth identification information.

As described above, the shopping information providing system 100 may display product information in accordance with interest and taste of a user and product information of other users who sympathize with the interest and the taste of the user on a user terminal, and thus the user may search for more products relating to the user's interest and taste, thereby increasing shopping satisfaction.

Figure 2:
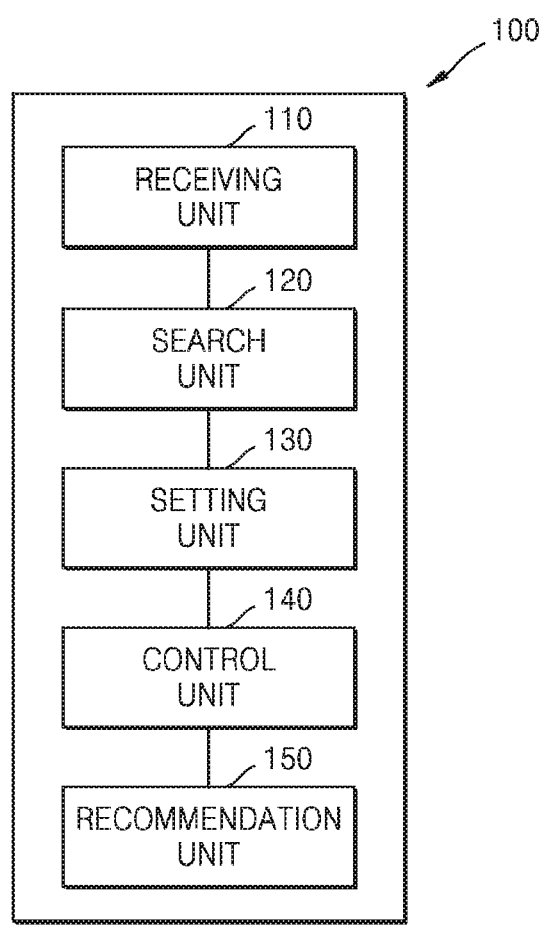
FIG. 2 is a schematic block diagram of a shopping information providing system according to another exemplary embodiment.

FIG. 2 is a schematic block diagram of the shopping information providing system 100 according to another exemplary embodiment. Redundant descriptions between FIGS. 1 and 2 are omitted below. Referring to FIG. 2, the shopping information providing system 100 may include the receiving unit 110, the search unit 120, the setting unit 130, the control unit 140, and a recommendation unit 150.

In relation to FIG. 1, it was described that the control unit 140 may output one or more pieces of third product information through fifth product information on a shopping home screen of a terminal of a first user whenever the first user accesses the shopping information providing system 100. However, in the FIG. 2 embodiment, the control unit 140 may output one or more pieces of third product information through fifth product information and one or more pieces of interest friend recommendation information transmitted from the recommendation unit 150 on the shopping home screen of the terminal of the first user whenever the first user accesses the shopping information providing system 100.

The recommendation unit 150 may generate and transmit the one or more pieces of interest friend recommendation information to the control unit 140. In this regard, the interest friend recommendation information may be provided to the shopping home screen of the terminal of the first user such that the first user may select an interest friend set by the setting unit 130 as a preference friend. If the first user views the interest friend recommendation information and selects the preference friend, whenever the first user accesses the shopping information providing system 100, the third through fifth product information reflecting a selection category and selection product information of the selected preference friend are displayed on the shopping home screen of the terminal of the first user, and thus the first user may search for more products related to the interest and taste of the first user, thereby increasing shopping satisfaction.

The interest friend recommendation information may include identification information of the interest friend and one or more pieces of product information relating to the interest friend. In this regard, the identification information of the interest friend may include one or more pieces of information from among a representative image of the interest friend, collected count information of the third product information that is commonly selected by the interest friend and the preference friend selected by the interest friend, collected count information regarding other users who store the interest friend as the preference friend, one or more pieces of representative product information regarding the interest friend, and a recommendation interest friend icon indicating a recommendation interest friend. If the first user views the interest friend recommendation information and clicks the recommendation interest friend icon to select the interest friend as the preference friend, the recommendation interest friend icon may be changed to a preference friend icon.

Figure 3:
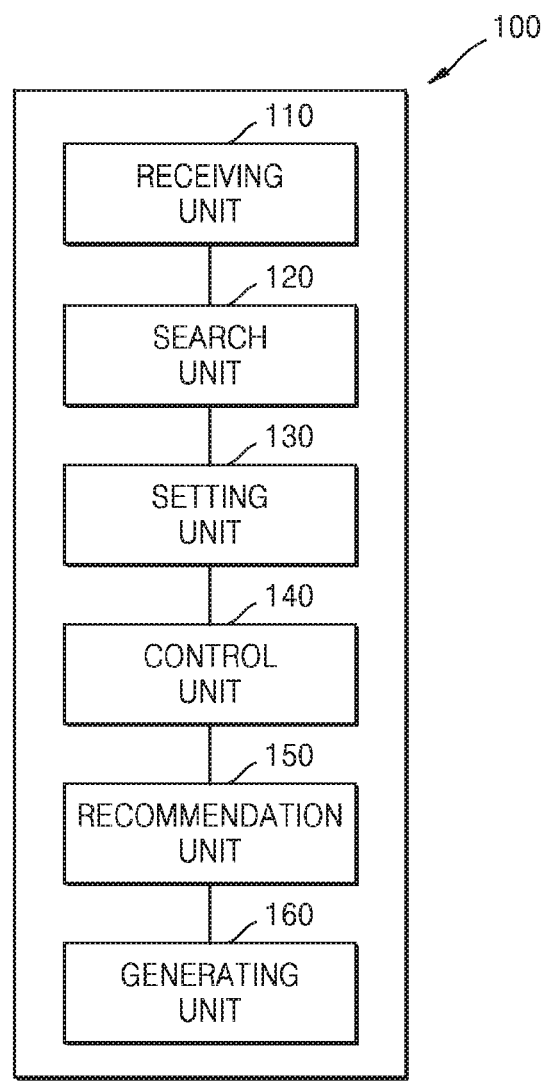
FIG. 3 is a schematic block diagram of a shopping information providing system according to another exemplary embodiment.

FIG. 3 is a schematic block diagram of the shopping information providing system 100 according to another exemplary embodiment. Redundant descriptions between FIGS. 1 and 2 and 3 are omitted below. Referring to FIG. 3, the shopping information providing system 100 may include the receiving unit 110, the search unit 120, the setting unit 130, the control unit 140, the recommendation unit 150, and a generating unit 160.

The control unit 140 may output a first menu on a shopping home screen of a terminal of a first user. In this regard, the first menu may include information relating to one or more preference friends selected and added by the first user, for example, a preference friend list view menu. If the control unit 140 receives a selection signal of the first menu from the first user, the control unit 140 may request a preference friend list from the generating unit 160 and output the preference friend list transmitted from the generating unit 160 on a screen of the terminal of the first user.

The generating unit 160 may generate the preference friend list according to a request of the control unit 140. In this regard, the preference friend list may include the one or more preference friends selected and added by the first user. Representative information of each preference friend may be output on the preference friend list. In this regard, the representative information may include one or more pieces of information selected from among identification information (e.g., a representative image of an interest friend) of each preference friend, one or more pieces of representative category information selected by each preference friend, collected count information of the third product information that is commonly selected by the first user and each preference friend, and collected count information regarding other users who store each preference friend as a preference friend.

In response to receiving a signal of selecting representative information of one preference friend included the preference friend list, the generating unit 160 may output detailed information of the preference friend of the selected representative information. In this regard, the detailed information may include one or more pieces of information selected from among identification information (e.g., the representative image of the interest friend) of the preference friend of the selected representative information, collected count information of third product information that is commonly selected by the first user and the preference friend, collected count information regarding other users who select the fourth product information of the preference friend, collected count information regarding other users who store the preference friend as a preference friend, one or more pieces of category information selected by other users from among one or more categories selected by the preference friend, identification information of the other users who store the preference friend as the preference friend, identification information of other users who are stored by the preference friend as preference friends, and the third through fifth product information relating to the preference friend.

In this regard, in response to receiving, by the first user, a signal of selecting one piece of identification information from among the identification information of the other users who store the preference friend as the preference friend and the identification information of other users who are stored by the preference friend as preference friends, the generating unit 160 may output detailed information relating to a user corresponding to the selected identification information.

Figure 4:
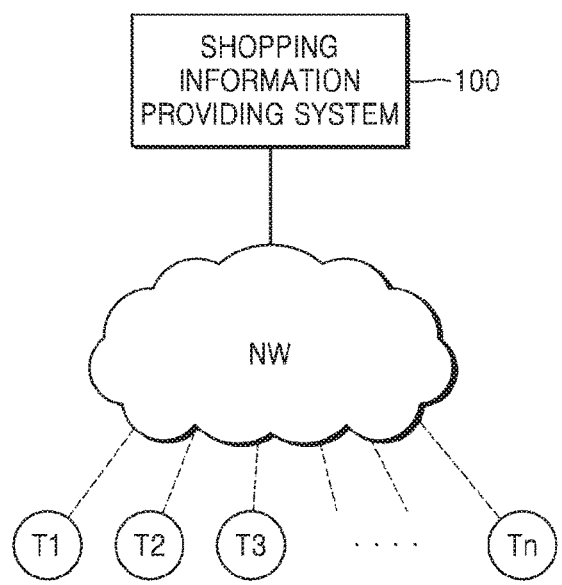
FIG. 4 is a diagram for describing a relationship between a plurality of user terminals and the shopping information providing system of FIG. 1, according to an exemplary embodiment.

FIG. 4 is a diagram for describing a relationship between a plurality of user terminals T1, T2, T3, . . . , Tn and the shopping information providing system 100 of FIG. 1, according to an exemplary embodiment. Referring to FIG. 4, the shopping information providing system 100 may be connected to the plurality of user terminals T1, T2, T3, . . . , Tn via a network NW including a wired and/or wireless communication network such as the Internet and/or intranet. That is, the above-described shopping information providing system 100 may be distinguished from the user terminals T1, T2, T3, . . . , Tn and may be connected to the network NW that is separated from the user terminals T1, T2, T3, . . . , Tn.

Figure 5:
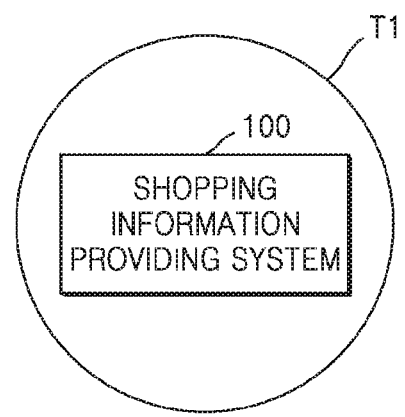
FIG. 5 is a diagram for describing a relationship between a first user terminal and the shopping information providing system of FIG. 1, according to another exemplary embodiment.

FIG. 5 is a diagram for describing a relationship between the first user terminal T1 and the shopping information providing system 100 of FIG. 1, according to another exemplary embodiment. Referring to FIG. 5, the shopping information providing system 100 may be included in the first user terminal T1. Although not shown, the shopping information providing system 100 may be included in a terminal of each user. The shopping information providing system 100 of the present embodiment may be included in the first user terminal T1 in various ways. As a specific embodiment, the shopping information providing system 100 may be installed in the terminal of each user via the network NW. For example, the shopping information providing system 100 may be installed in the form of an application in the first user terminal T1. As another specific embodiment, the shopping information providing system 100 may be installed in the first user terminal T1 via an offline method. However, these are examples and the present invention is not limited thereto. The shopping information providing system 100 may be installed in the first user terminal T1 in various forms.

Figure 6:
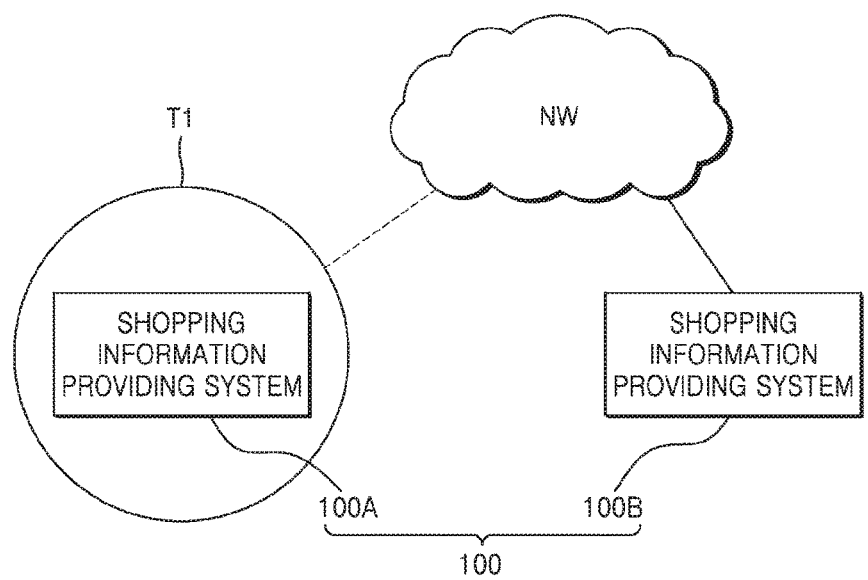
FIG. 6 is a diagram for describing a relationship between a first user terminal and the shopping information providing system of FIG. 1, according to another exemplary embodiment.

FIG. 6 is a diagram for describing a relationship between the first user terminal T1 and the shopping information providing system 100 of FIG. 1, according to another exemplary embodiment. Referring to FIG. 6, a part 100A of the shopping information providing system 100 may be included in the first user terminal T1, and another part 100B thereof may be connected to the first user terminal T1 via the network NW.

For example, the part 100A including the receiving unit 110 among the elements of the shopping information providing system 100 of FIGS. 1 through 3 may be included in the first user terminal T1. A method of including the part 100A of the shopping information providing system 100 in the first user terminal T1 is the same as described with reference to FIG. 5 above, and thus a detailed description thereof is omitted. The part 100B including the search unit 120, the setting unit 130, the control unit 140, the recommendation unit 150, and the generating unit 160 among the elements of the shopping information providing system 100 of FIGS. 1 through 3 may be connected to the first user terminal T1 via the network NW.

Although the search unit 120, the setting unit 130, the control unit 140, the recommendation unit 150, and the generating unit 160 of the shopping information providing system 100 are connected to the first user terminal T1 via the network NW as the part 110B in the present embodiment, this is only an example and the present invention is not limited thereto. That is, at least one of the plurality of elements included in the shopping information providing system 100 may be selectively connected to the first user terminal T1 via the network NW.

Figure 7:
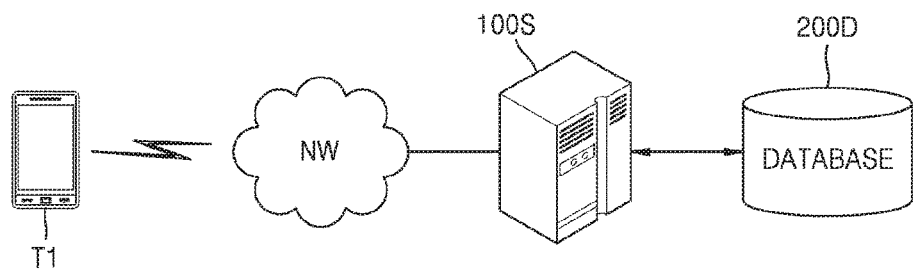
FIG. 7 is a schematic diagram for describing a shopping information providing system according to another exemplary embodiment.

FIG. 7 is a schematic diagram for describing the shopping information providing system 100 according to another exemplary embodiment. Redundant descriptions between FIGS. 1 through 6 and 7 are omitted below.

Referring to FIG. 7, the shopping information providing system 100 may be implemented as a shopping information providing server 100S, and the first user terminal T1 may be connected to the shopping information providing server 100S via the network NW. The shopping information providing server 100S may provide a database 200D and information stored in the database 200D to the first use terminal T1 or may store information received from the first user terminal T1 via the shopping information providing server 100S in the database 20D.

The first user terminal T1 may be an apparatus for accessing the shopping information providing server 100S via the network NW and may be a handheld apparatus, a smart phone, a tablet, a tablet PC, etc. The first user terminal T1 may access the shopping information providing server 100S to receive one or more pieces of the third through fifth product information, one or more pieces of interest friend recommendation information, and a recommendation friend list.

The shopping information providing server 100S may display category information on all accessed user terminals, receive the category information selected by all accessed user terminals and one or more pieces of product information selected from a plurality of pieces of product information included in the selected category information, and store the received category information and product information in the database 200D. If a first user accesses the shopping information providing server 100S, the shopping information providing server 100S may search for one or more second user(s) who select(s) one or more pieces of first product information from the first product information selected by the first user, and may search for second product information as one or more pieces of product information selected by the found second user from among a plurality of pieces of product information included in one or more pieces of low class category information selected by the second user. The shopping information providing server 100S may set the one or more second user(s) as an interest friend of the first user based on collected count information regarding the third product information that is commonly selected by the first user and the second user. The shopping information providing server 100S may provide a first menu confirming the third through fifth product information, the one or more pieces of interest friend recommendation information, and the recommendation friend list on a shopping home screen of the first user terminal T1. The shopping information providing server 100S may generate a list of one or more preference friends who are selected and added by the first user by receiving a signal of selecting the first menu and may output the list of one or more preference friends on a screen of the first user terminal T1.

Figure 8:
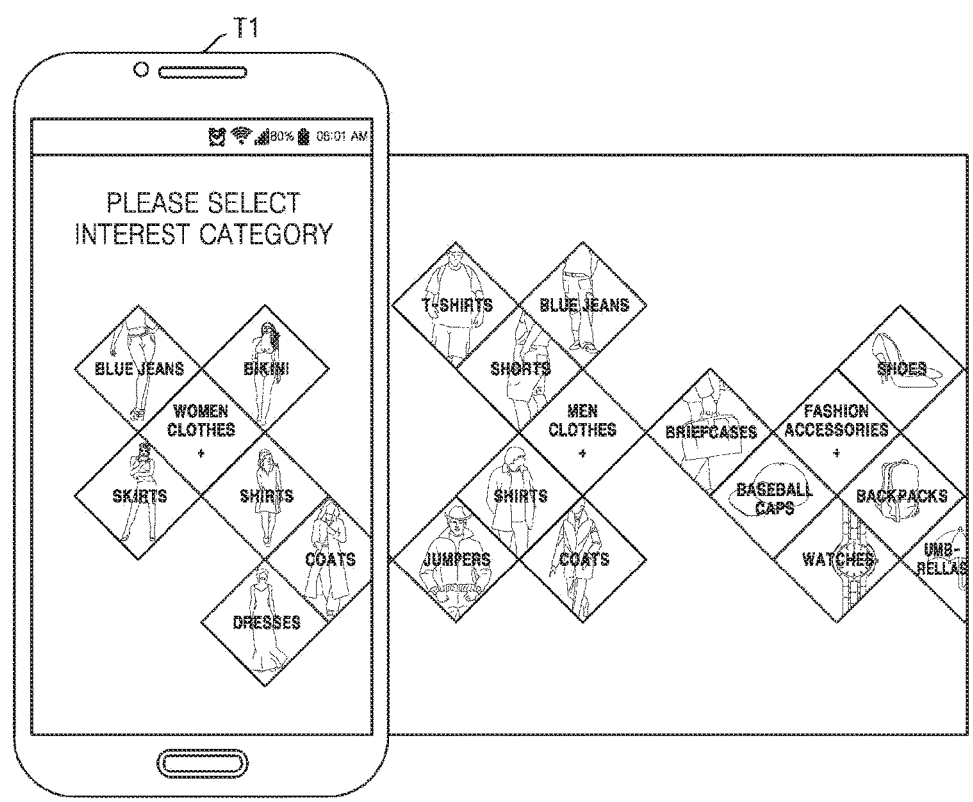
FIGS. 8, 9A, 9B, 10, 11, 12A and 12B are exemplary diagrams of a shopping information screen of a first user terminal provided by a shopping information providing system, according to an exemplary embodiment.

FIGS. 8 through 12 are exemplary diagrams of a shopping information screen of the first user terminal T1 provided by the shopping information providing system 100, according to an exemplary embodiment. FIG. 8 is an exemplary diagram of a category selection request screen of the first user terminal T1 provided by the shopping information providing system 100. Referring to FIG. 8, as described above, category information displayed on the category selection request screen may not indicate a hierarchical classification of common features of products in an order from higher features to lower features but may subdivide entire categories including the high class category, the middle class category, and the low class category, and provide the subdivided categories on one screen horizontally. A first user may select one or more desired low class categories from the category selection request screen and may select desired product information from among a plurality of pieces of product information included in the selected low class categories.

Figure 9A:
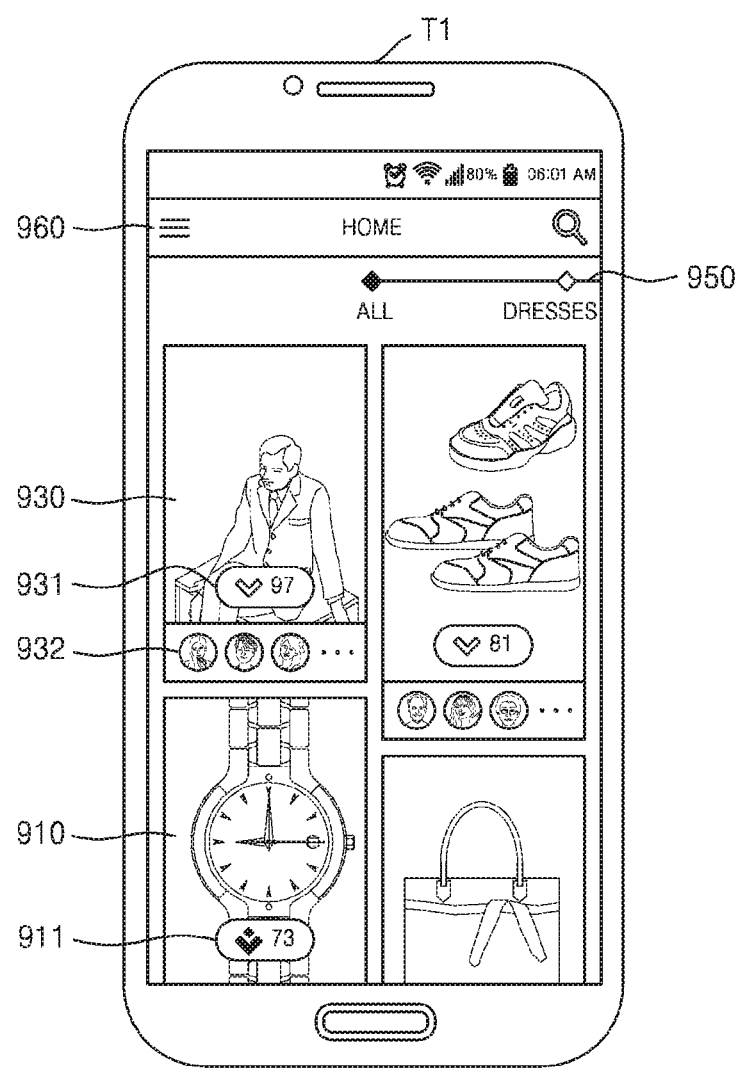
Figure 9B:
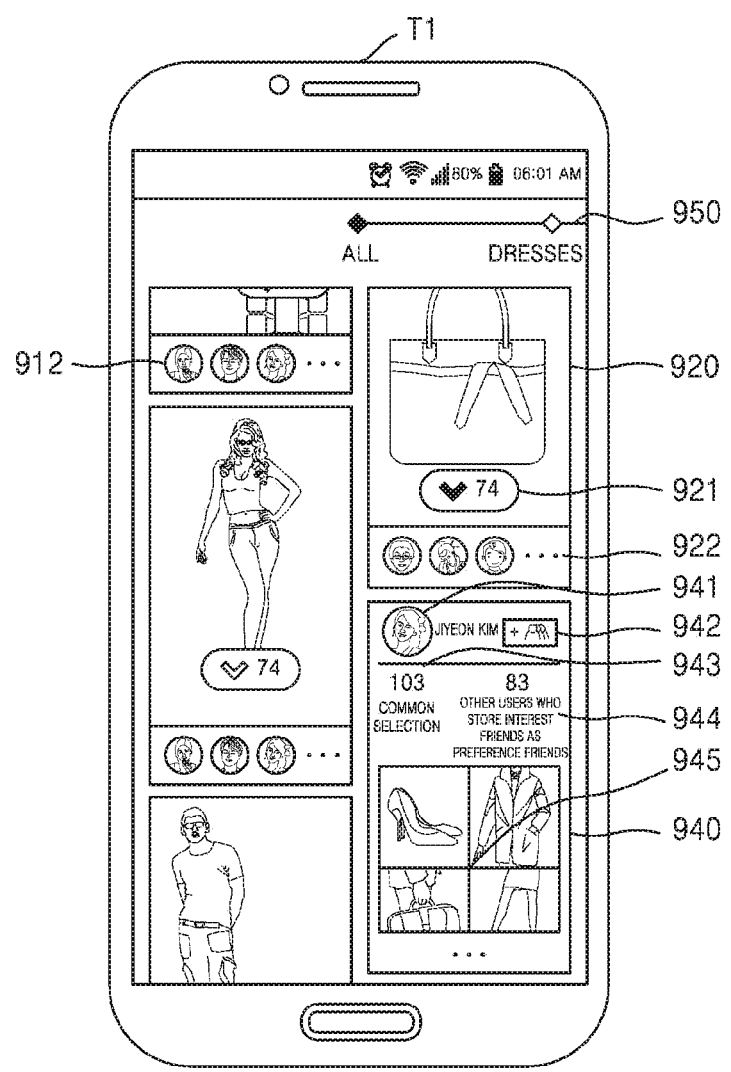

FIGS. 9A and 9B are exemplary diagrams of a shopping home screen of the first user terminal T1 that accesses the shopping information providing system 100. Referring to FIGS. 9A and 9B, third product information 910, fourth product information 920, fifth product information 930, interest friend recommendation information 940, a category line 950, and a shopping menu 960 may be provided on the shopping home screen of the first user terminal T1.

The shopping information providing system 100 may output the third product information 910 including a representative image indicating the third product information 910, first interest information 911 including a first indicator indicating that a first user and one or more interest friends have commonly selected the third product information 910 and collected count information with respect to the number of the interest friends who commonly selected the third product information 910, and one or more pieces of first identification information 912 indicating the interest friends who commonly selected the third product information 910 on the shopping home screen of the first user terminal T1.

The shopping information providing system 100 may output the fourth product information 920 including a representative image indicating the fourth product information 920, second interest information 921 including a second indicator indicating that only the first user has selected the fourth product information 920 and then the system will collect count information with respect to other users who later select the fourth product information 920, and one or more pieces of second identification information 922 indicating the users who select the fourth product information 920 on the shopping home screen of the first user terminal T1.

The shopping information providing system 100 may output the fifth product information 930 including a representative image indicating the fifth product information 930, third interest information 931 including a third indicator indicating that only a second user selected the fifth product information 930 and then the system will collect count information with respect to other users who later select the fifth product information 930, and one or more pieces of third identification information 932 indicating the users who select the fifth product information 930 on the shopping home screen of the first user terminal T1.

The shopping information providing system 100 may output the interest friend recommendation information 940 including a representative image indicating an interest friend, a recommendation interest friend icon 942 indicating a recommendation interest friend, collected count information 943 of the third product information 910 that is commonly selected by the interest friend and other users who are stored by the interest friend as preference friends, collected count information 944 with respect to the other users who are stored by the interest friend as preference friends, and one or more product information images 945 related to the interest friend on the shopping home screen of the first user terminal T1.

The shopping information providing system 100 may output the category line 950 on the shopping home screen of the first user terminal T1. The shopping information providing system 100 may set categories displayed on an interest category selection request screen of FIG. 8 at arbitrary locations of the category line 950. If an arbitrary location on the category line 950 is touched by manipulation of the first user, the shopping information providing system 100 may output the one or more pieces of third product information through fifth product information 910 through 930 corresponding to a category set at the touched location to the first user terminal T1.

The shopping information providing system 100 may output the shopping menu 960 on the shopping home screen of the first user terminal T1. The shopping menu 960 may include information relating to one or more preference friends who are selected and added by the first user, for example, a first menu as a preference friend list view menu. The shopping information providing system 100 may output information relating to a preference friend list on the first user terminal T1 in response to a selection of the first menu.

Figure 10:
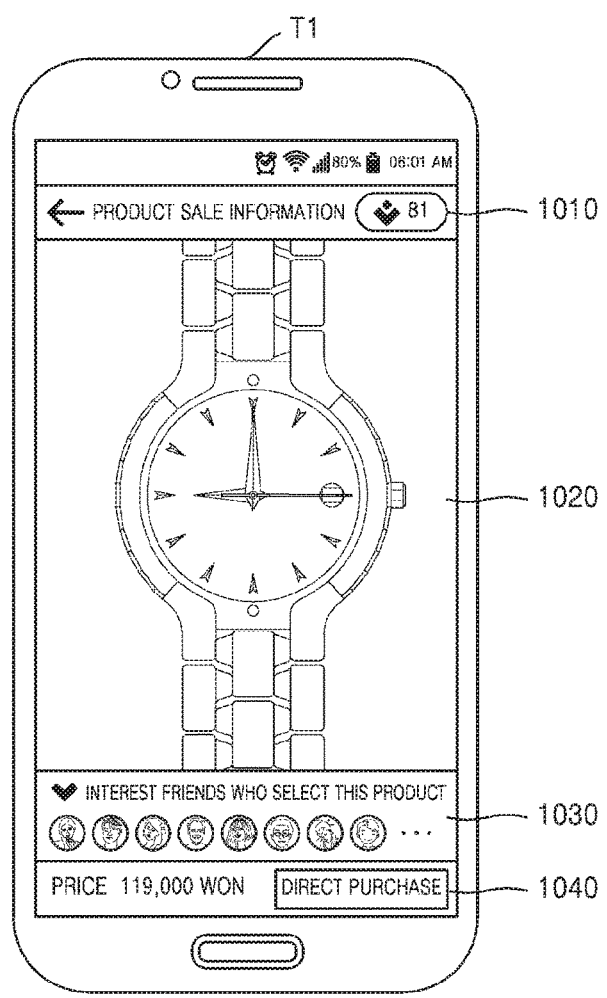

FIG. 10 is an exemplary diagram of a sale screen of the third product information 910 of the first user terminal T1 provided by the shopping information providing system 100 by receiving a signal of arbitrarily selecting the third product information 910 from among the third product information through the fifth product information 910 through 930 provided on the shopping home screen of FIG. 9. Referring to FIG. 10, the sale screen provided by the shopping information providing system 100 may output collected count information 1010 with respect to the interest friend who commonly selects the third product information 910, an image 1020 of the third product information 910, one or more pieces of fourth identification information 1030 indicating the interest friend(s) who commonly select(s) the third product information 910 with the first user, price information 1040, and further a detailed description (not shown) of the third product information 910. In response to receiving a signal of selecting one piece of fourth identification information from among the one or more pieces of fourth identification information 1030, the shopping information providing system 100 may output the third product information through the fifth product information 910 through 930 relating to the interest friend included in the selected fourth identification information 1030.

Figure 11:
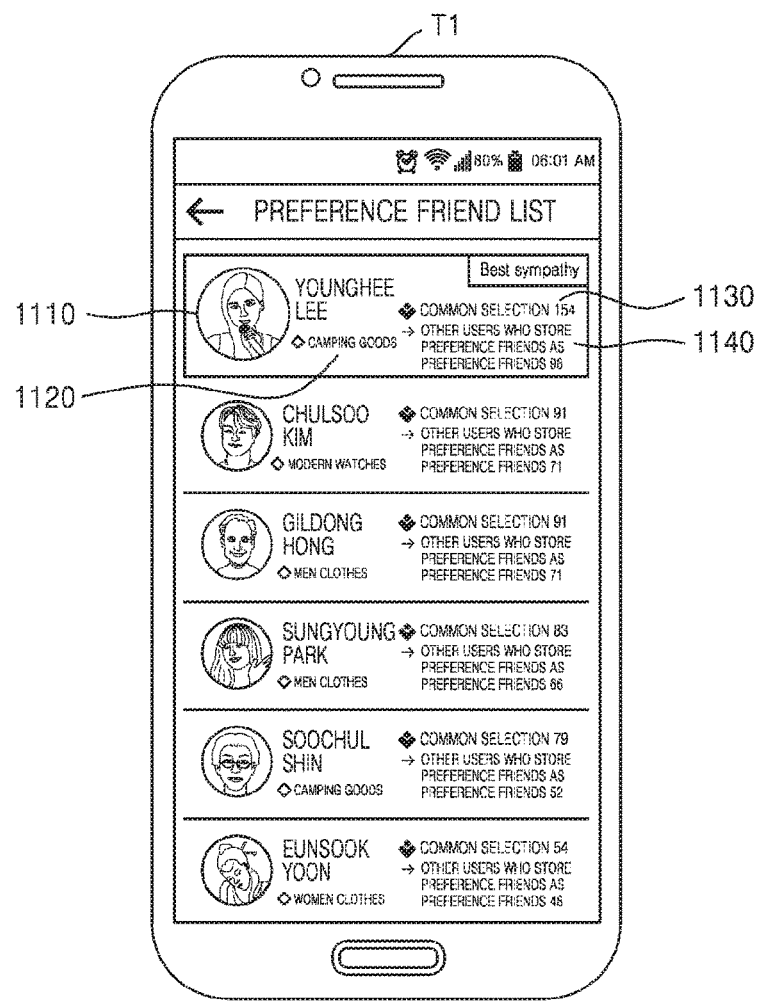

FIG. 11 is an exemplary diagram of a preference friend list screen of the first user terminal T1 provided by the shopping information providing system 100 by selecting the preference friend list view menu included in the shopping menu 960 provided on the shopping home screen of FIG. 9. Referring to FIG. 11, a preference friend list may include one or more preference friends who are selected and added by the first user. The preference friend list screen may output one or more pieces of information from among identification information 1110 (e.g., representative images indicating the preference friends) of the preference friends, one or more pieces of representative category information 1120 selected by the preference friends, collected count information 1130 of the third product information 910 that is commonly selected by the first user and the preference friends, and collected count information 1140 with respect to other users who store the preference friends as preference friends. In this regard, the preference friends included in the preference friend list may be prioritized and output. The preference friends may be output in the order of higher collected count information of the third product information 910 that is commonly selected along with the preference friends.

Figure 12A:
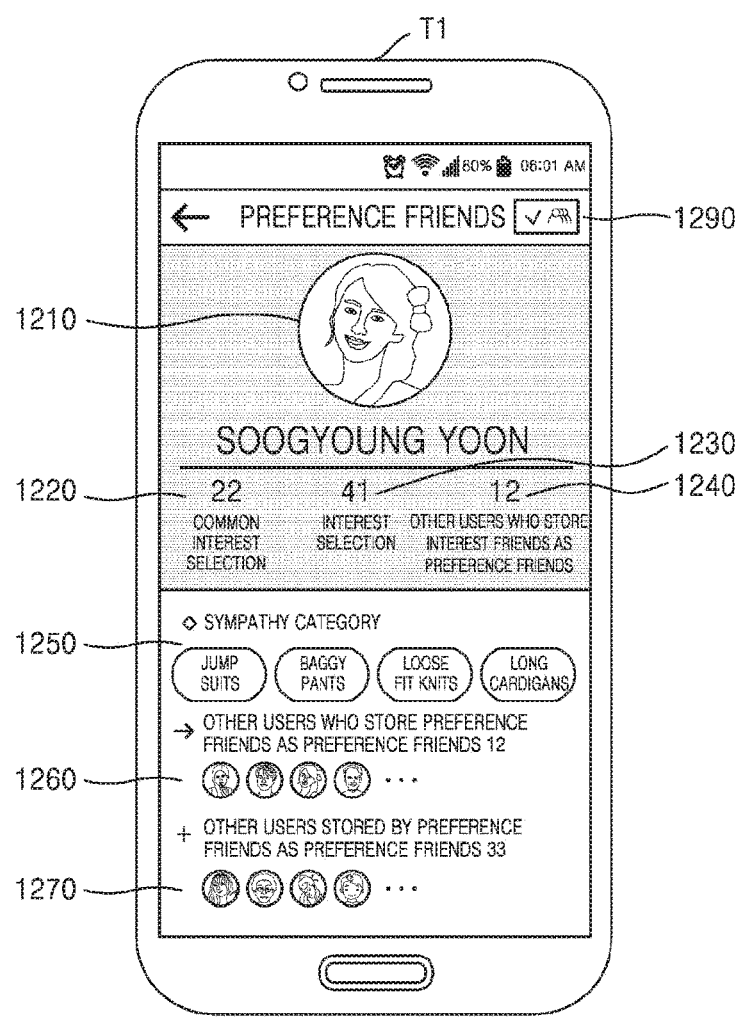
Figure 12B:
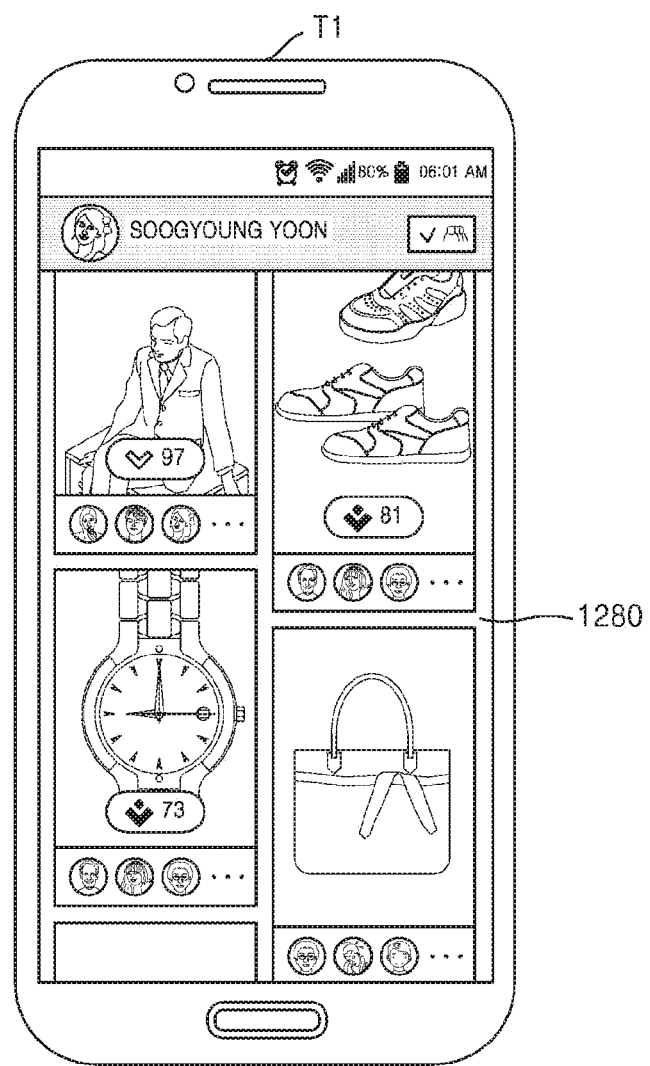

FIGS. 12A and 12B are exemplary diagrams showing that when a preference friend is selected from the preference friend list of FIG. 11, a detailed information screen of the selected preference friend of the first user terminal T1 is provided by the shopping information providing system 100. Referring to FIGS. 12A and 12B, in response to receiving a signal of selecting the preference friend from the preference friend list, as shown in FIG. 12A, the shopping information providing system 100 may include identification information 1110 (e.g., a representative image indicating the selected preference friend) of the selected preference friend, collected count information 1220 of the third product information 910 that is commonly selected by the first user and the selected preference friend, collected count information 1230 with respect to other users who select the fourth product information 920 of the selected preference friend, collected count information 1240 with respect to other users who store the selected preference friend as a preference friend, one or more pieces of category information 1250 selected by other users with respect to one or more categories selected by an interest friend, identification information 1260 of the other users who store the selected preference friend as the preference friend, identification information 1270 of other users stored by the selected preference friend as preference friends, and one or more pieces of product information 1280 from among the third product information through the fifth product information 910 through 930 relating to an interest friend of FIG. 12B. The shopping information providing system 100 may also output a preference friend icon 1290 indicating that the selected preference friend is a preference friend selected by the first user. In response to receiving a signal of selecting, by the first user, one piece of identification information from among the identification information 1260 of the other users who store the selected preference friend as the preference friend and the identification information 1270 of other users stored by the selected preference friend as preference friends, the shopping information providing system 100 may also output information relating to a user corresponding to the selected identification information.

Figure 13:
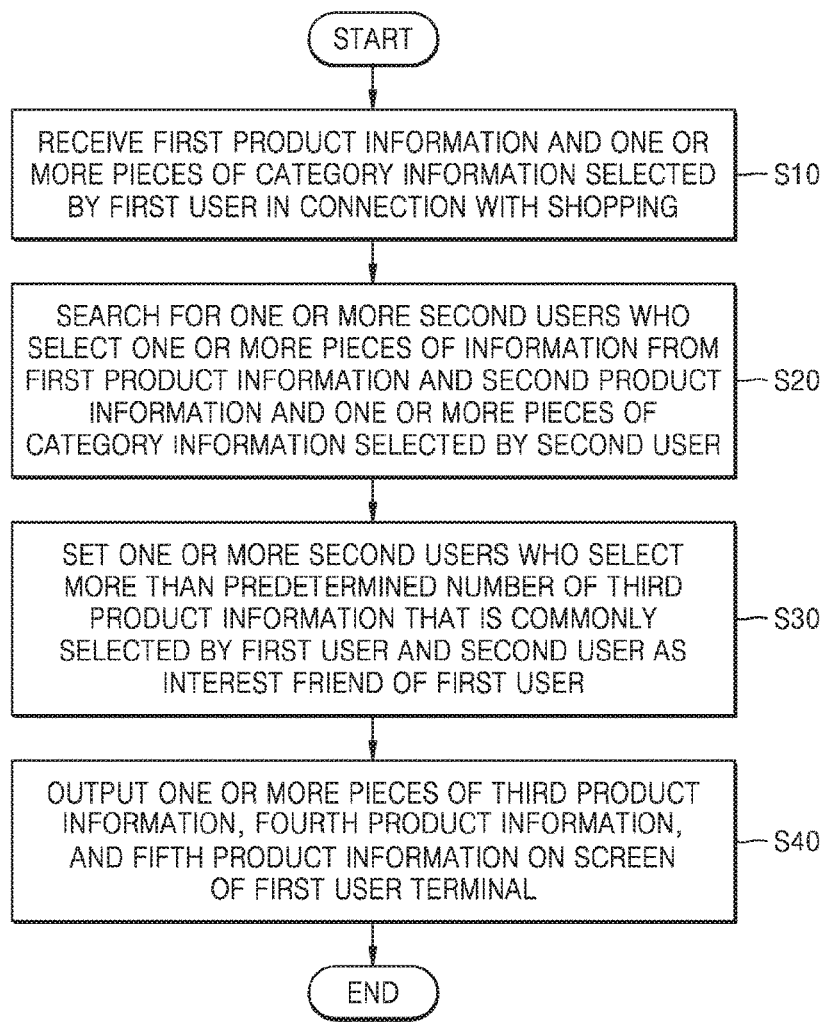
FIG. 13 is a flowchart of a shopping information providing method according to an exemplary embodiment.

FIG. 13 is a flowchart of a shopping information providing method according to an exemplary embodiment. Redundant descriptions between FIGS. 1 through 12 and 13 are omitted below. Referring to FIG. 13, the shopping information providing system 100 may receive first product information as one or more pieces of product information selected by a first user from among a plurality of pieces of product information included in one or more pieces of category information selected by the first user in connection with shopping (operation S10). In this regard, the shopping information providing system 100 may display the category information on all accessed user terminals and receive and store one or more product information selected by all accessed users from among the plurality of pieces of product information included in the category information.

The shopping information providing system 100 may search for one or more second user(s) who selected one or more pieces of information from the first product information selected by the first user from the received selection category information and selection product information of users, and may search for second product information as one or more pieces of product information selected by the found second user from among a plurality of pieces of product information included in one or more pieces of category information selected by the second user (operation S20).

The shopping information providing system 100 may set one or more second users who selected more than a predetermined number of pieces of third product information that is commonly selected by the first user and the second user as an interest friend of the first user (operation S30).

When the interest friend of the first user has been completely set, the shopping information providing system 100 may output one or more pieces of third product information through fifth product information on a shopping home screen of a first user terminal whenever the first user accesses the shopping information providing system 100 (operation S40).

As a selective embodiment, the shopping information providing system 100 may output interest friend recommendation information on a shopping home screen of the first user terminal such that the first user may select the interest friend as a preference friend. If the first user views the interest friend recommendation information and selects the preference friend, whenever the first user accesses the shopping information providing system 100, the shopping information providing system 100 may output third through fifth product information reflecting category and selection product information selected by the preference friend on the shopping home screen of the first user terminal.

As a selective embodiment, the shopping information providing system 100 may provide a preference friend list view menu, in response to receiving a signal of selecting the preference friend list view menu, output a preference friend list on a screen of the first user terminal, and provide representative information and detailed information of preference friends.

As described above, according to the one or more of the above exemplary embodiments, a shopping information providing system may display product information in accordance with interest and taste of a user and product information of other users who sympathize with the interest and taste of the user on a user terminal, and thus the user may search for more products relating to the user's interest and taste, thereby increasing shopping satisfaction.

According to the one or more of the above exemplary embodiments, a shopping information providing system may recommend product information in accordance with the interest and taste of a user and other users who sympathize with the interest and taste of the user as interest friends on a user terminal to allow the user to search for product information of the interest friends, and thus the user may add previously disinterested categories and product information as new interested categories and product information to search for more various products, thereby increasing shopping satisfaction.

The one or more of the above exemplary embodiments may be embodied as a computer program that can be executed in a non-transitory computer using various components. The computer program may be recorded on a non-transitory computer-readable recording medium. Examples of the non-transitory computer-readable recording medium may include a magnetic recording medium (a hard disc, a floppy disc, a magnetic tape, etc.), an optical recording medium (a CD-ROM, a DVD, etc.), a magneto-optical medium (e.g., a floptical disk), and a hardware device (e.g., a ROM, a RAM, a flash memory, etc.) specially designed to store and execute program commands. Furthermore, the non-transitory computer-readable recording medium may be a formless medium that can be transmitted and distributed in a network, e.g., software or an application.

The computer program may be designed and configured specially for the inventive concept or would be obvious to those of ordinary skill in the field of computer software. Examples of the computer program include not only machine language codes prepared by a compiler but also high-level language codes executable by a computer using an interpreter.

The use of the terms 'a', 'an', and 'the' and similar referents in the context of describing the inventive concept (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein.

Finally, the operations of all methods described herein can be performed in an appropriate order unless otherwise indicated herein or otherwise clearly contradicted by context. The inventive concept is not limited by an order in which the operations are described herein. The use of any and all examples, or exemplary language (e.g., "such as") provided herein, is intended merely to clearly describe the inventive concept and does not pose a limitation on the scope of the inventive concept unless otherwise claimed. Numerous modifications and adaptations will be readily apparent to those of ordinary skill in this art without departing from the spirit and scope of the inventive concept.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A computer-implemented shopping information providing system comprising:
   a computer processor having a plurality of functional units configured for performing a plurality of corresponding functions, the functional units including:
   a receiving unit configured to receive first product information as one or more pieces of product information selected by a first user of a first user terminal from among a plurality of pieces of product information included in one or more pieces of category information selected by the first user in connection with shopping;
   a search unit configured to search for one or more second users of one or more other user terminals who selected one or more pieces of information among the first product information and search for second product information as one or more pieces of product information selected by the second user from among a plurality of pieces of product information included in one or more pieces of category information selected by the second user, wherein the first user terminal and the one or more other user terminals are connected to the shopping information providing system via the internet;
   a setting unit configured to set one or more second users who selected more than a predetermined number of third product information that is commonly selected by the first user and the second user as an interest friend of the first user; and
   a control unit configured to provide one or more pieces of information from among the one or more pieces of the third product information, fourth product information as one or more pieces of product information excluding the third product information from the first product information, and fifth product information as one or more pieces of product information excluding the third product information from the second product information to a screen of the first user terminal of the first user,
   wherein the control unit outputs first interest information including a first indicator indicating that the first user and one or more interest friends commonly selected the third product information and collected count information with respect to the one or more interest friends who commonly selected the third product information on a part of a region displaying the third product information,
   wherein the control unit outputs second interest information including a second indicator indicating that the first user selected the fourth product information and collected count information with respect to other users who selected the fourth product information on a part of a region displaying the fourth product information, or
   wherein the control unit outputs third interest information including a third indicator indicating that the second user selected the fifth product information and collected count information with respect to other users who selected the fifth product information on a part of a region displaying the fifth product information.

2. The computer-implemented shopping information providing system of claim 1, further comprising: a recommendation unit configured to generate interest friend recommendation information including identification information of the interest friend and one or more pieces of product information relating to the interest friend and providing the interest friend recommendation information to the first user such that the first user can select the interest friend set by the setting unit as a preference friend.

3. The computer-implemented shopping information providing system of claim 2, further comprising: a generating unit configured to generate a preference friend list as information relating to one or more preference friends who are selected and added by the first user from the interest friend recommendation information according to a request of the first user and providing the preference friend list to the first user.

4. The computer-implemented shopping information providing system of claim 3, wherein the generating unit generates, for each of the one or more preference friends, the preference friend list including one or more pieces of information from among identification information of the one or more preference friends, one or more pieces of representative category information selected by the one or more preference friends, collected count information of the third product information that is commonly selected by the first user and the one or more preference friends, and collected count information regarding other users who store the one or more preference friends as one or more preference friends, and provides the preference friend list to the first user.

5. The computer-implemented shopping information providing system of claim 4, wherein, in response to receiving a signal of selecting information of one preference friend included the preference friend list, the generating unit generates and outputs one or more pieces of information from among identification information of the preference friend whose information is selected, collected count information of the third product information that is commonly selected by the first user and the preference friend, collected count information regarding other users who select the fourth product information of the preference friend, collected count information regarding other users who store the preference friend as a preference friend, one or more pieces of category information selected by other users from among one or more categories selected by the preference friend, identification information of the other users who store the preference friend as the preference friend, identification information of other users who are stored by the preference friend as preference friends, and the third through fifth product information relating to the preference friend.

6. The computer-implemented shopping information providing system of claim 1, wherein, in response to receiving a signal of selecting one piece of product information from among the third through fifth product information for purchase, the control unit outputs one or more pieces of the fourth identification information indicating sale information relating to the selected identification information or one or more users or interest friends who selected the selected product information or commonly selected the selected identification information.

7. The computer-implemented shopping information providing system of claim 6, wherein, in response to receiving a signal of selecting one piece of fourth identification information from among the one or more pieces of fourth identification information, the control unit outputs the third through fifth product information relating to the one or more users or interest friends included in the selected identification information.

8. A computer-implemented shopping information providing system comprising:
   a computer processor having a plurality of functional units configured for performing a plurality of corresponding functions, the functional units including:
   a receiving unit configured to receive first product information as one or more pieces of product information selected by a first user of a first user terminal from among a plurality of pieces of product information included in one or more pieces of category information selected by the first user in connection with shopping;
   a search unit configured to search for one or more second users of one or more other user terminals who selected one or more pieces of information among the first product information and search for second product information as one or more pieces of product information selected by the second user from among a plurality of pieces of product information included in one or more pieces of category information selected by the second user, wherein the first user terminal and the one or more other user terminals are connected to the shopping information providing system via the internet;
   a setting unit configured to set one or more second users who selected more than a predetermined number of third product information that is commonly selected by the first user and the second user as an interest friend of the first user; and
   a control unit configured to provide one or more pieces of information from among the one or more pieces of the third product information, fourth product information as one or more pieces of product information excluding the third product information from the first product information, and fifth product information as one or more pieces of product information excluding the third product information from the second product information to a screen of the first user terminal of the first user,
   wherein the control unit outputs one or more pieces of first identification information indicating the interest friend who commonly selected the third product information on another part of a region displaying the third product information,
   wherein the control unit outputs one or more pieces of second identification information indicating one or more users who selected the fourth product information on another part of a region displaying the fourth product information, or
   wherein the control unit outputs one or more pieces of third identification information indicating one or more users who selected the fifth product information on another part of a region displaying the fifth product information.

9. The computer-implemented shopping information providing system of claim 8, wherein, in response to receiving a signal of selecting one piece of identification information from among the one or more pieces of first through third identification information, the control unit outputs the third through fifth product information relating to a user or an interest friend included in the selected identification information.

10. A computer-implemented shopping information providing method comprising:
  receiving first product information as one or more pieces of product information selected by a first user of a first user terminal from among a plurality of pieces of product information included in one or more pieces of category information selected by the first user in connection with shopping;
  searching for one or more second users of one or more other user terminals who selected one or more pieces of information among the first product information and searching for a second product information as one or more pieces of product information selected by the second user from among a plurality of pieces of product information included in one or more pieces of category information selected by the second user;
  setting one or more second users who selected more than a predetermined number of third product information that is commonly selected by the first user and the second user as an interest friend of the first user;
  providing one or more pieces of information from among the one or more pieces of the third product information, fourth product information as one or more pieces of product information excluding the third product information from the first product information, and fifth product information as one or more pieces of product information excluding the third product information from the second product information to the first user;
  outputting first interest information including a first indicator indicating that the first user and one or more interest friends commonly selected the third product information and collected count information with respect to the one or more interest friends who commonly selected the third product information on a part of a region displaying the third product information;
  outputting second interest information including a second indicator indicating that the first user selected the fourth product information and collected count information with respect to other users who selected the fourth product information on a part of a region displaying the fourth product information; and
  outputting third interest information including a third indicator indicating that the second user selected the fifth product information and collected count information with respect to other users who selected the fifth product information on a part of a region displaying the fifth product information.

11. The computer-implemented shopping information providing method of claim 10, further comprising: generating interest friend recommendation information including identification information of the interest friend and one or more pieces of product information relating to the interest friend and providing the interest friend recommendation information to the first user such that the first user can select the interest friend set as a preference friend. interest friend recommendation information to the first user such that the first user can select the interest friend set as a preference friend.

12. The computer-implemented shopping information providing method of claim 11, further comprising: generating a preference friend list as information relating to one or more preference friends who are selected and added by the first user from the interest friend recommendation information according to a request of the first user and providing the preference friend list to the first user.

13. The computer-implemented shopping information providing method of claim 12, further comprising, for each of the one or more preference friends, generating the preference friend list including one or more pieces of information from among identification information of the one or more preference friends, one or more pieces of representative category information selected by the one or more preference friends, collected count information of the third product information that is commonly selected by the first user and the one or more preference friends, and collected count information regarding other users who store the one or more preference friends as one or more preference friends, and providing the preference friend list to the first user.

14. The computer-implemented shopping information providing method of claim 13, further comprising, in response to receiving a signal of selecting information of one preference friend included the preference friend list, generating and outputting one or more pieces of information from among identification information of the preference friend whose information is selected, collected count information of the third product information that is commonly selected by the first user and the preference friend, collected count information regarding other users who select the fourth product information of the preference friend, collected count information regarding other users who store the preference friend as a preference friend, one or more pieces of category information selected by other users from among one or more categories selected by the preference friend, identification information of the other users who stored the preference friend as the preference friend, identification information of other users who are stored by the preference friend as preference friends, and the third through fifth product information relating to the preference friend.

15. The computer-implemented shopping information providing method of claim 10, further comprising: in response to receiving a signal of selecting one piece of product information from among the third through fifth product information for purchase, outputting sale information relating to the selected product information and fourth identification information indicating one or more users or interest friends who selected the selected product information or commonly select the selected product information; and
  in response to receiving a signal of selecting one piece of fourth identification information from among the one or more pieces of the fourth identification information, outputting the third through fifth product information relating to the one or more users or interest friends included in the selected fourth identification information.

16. A computer-implemented shopping information providing method comprising:
  receiving first product information as one or more pieces of product information selected by a first user of a first user terminal from among a plurality of pieces of product information included in one or more pieces of category information selected by the first user in connection with shopping;
  searching for one or more second users of one or more other user terminals who selected one or more pieces of information among the first product information and searching for a second product information as one or more pieces of product information selected by the second user from among a plurality of pieces of product information included in one or more pieces of category information selected by the second user;
  setting one or more second users who selected more than a predetermined number of third product information that is commonly selected by the first user and the second user as an interest friend of the first user;

providing one or more pieces of information from among the one or more pieces of the third product information, fourth product information as one or more pieces of product information excluding the third product information from the first product information, and fifth product information as one or more pieces of product information excluding the third product information from the second product information to the first user;

outputting one or more pieces of first identification information indicating the interest friend who commonly selected the third product information on another part of a region displaying the third product information;

outputting one or more pieces of second identification information indicating one or more users who selected the fourth product information on another part of a region displaying the fourth product information; and outputting one or more pieces of third identification information indicating one or more users who selected the fifth product information on another part of a region displaying the fifth product information.

17. The computer-implemented shopping information providing method of claim 16, further comprising: in response to receiving a signal of selecting one piece of identification information from among the one or more pieces of first through third identification information, outputting the third through fifth product information relating to a user or an interest friend included in the selected identification information.

* * * * *